United States Patent
Guralp et al.

(10) Patent No.: US 9,394,838 B2
(45) Date of Patent: Jul. 19, 2016

(54) METHOD AND APPARATUS FOR CONTROLLING OPERATION OF AN INTERNAL COMBUSTION ENGINE OPERATING IN HCCI COMBUSTION MODE

(71) Applicant: GM GLOBAL TECHNOLOGY OPERATIONS LLC, Detroit, MI (US)

(72) Inventors: Orgun A. Guralp, Ann Arbor, MI (US); Jun-Mo Kang, Ann Arbor, MI (US); Hanho Yun, Oakland Township, MI (US); Sai S. V. Rajagopalan, Sterling Heights, MI (US); Yongjie Zhu, Troy, MI (US); Chen-Fang Chang, Troy, MI (US); Paul M. Najt, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 295 days.

(21) Appl. No.: 14/077,364

(22) Filed: Nov. 12, 2013

(65) Prior Publication Data

US 2015/0128909 A1 May 14, 2015

(51) Int. Cl.
| | | |
|---|---|---|
| *F02D 41/30* | (2006.01) | |
| *F02D 41/00* | (2006.01) | |
| *F02D 41/14* | (2006.01) | |
| *F02D 13/02* | (2006.01) | |
| *F02D 41/04* | (2006.01) | |
| *F02B 1/12* | (2006.01) | |

(52) U.S. Cl.
CPC ........ *F02D 41/0002* (2013.01); *F02D 13/0207* (2013.01); *F02D 13/0219* (2013.01); *F02D 41/1454* (2013.01); *F02D 41/3035* (2013.01); *F02B 1/12* (2013.01); *F02D 41/045* (2013.01); *F02D 2041/001* (2013.01); *F02D 2200/602* (2013.01); *F02M 26/16* (2016.02); *Y02T 10/128* (2013.01); *Y02T 10/18* (2013.01); *Y02T 10/42* (2013.01)

(58) Field of Classification Search
CPC . F02D 19/0671; F02D 41/00; F02D 41/0007; F02D 41/0025; F02D 41/3023; F02D 41/3035; F01L 1/344; F01L 13/0036; Y02T 10/126; Y02T 10/128; Y02T 10/32; Y02T 10/36
USPC ............ 123/1 A, 3, 295, 299, 305, 478, 525, 123/575–578, 568.11, 90.15–90.17; 701/103–105, 108, 113
See application file for complete search history.

(56) References Cited

U.S. PATENT DOCUMENTS

| | | | |
|---|---|---|---|
| 6,928,982 B1* | 8/2005 | Albertson | F02D 41/0087 123/198 F |
| 7,801,664 B2* | 9/2010 | Winstead | F02D 13/0207 123/198 F |
| 8,165,787 B2* | 4/2012 | Reed | F02D 41/0235 60/285 |
| 2003/0209211 A1* | 11/2003 | Collier, Jr. | F02B 43/10 123/1 A |
| 2010/0269771 A1* | 10/2010 | Wermuth | F02D 13/0211 123/90.16 |
| 2011/0132285 A1* | 6/2011 | Pursifull | F01N 5/02 123/3 |
| 2011/0132286 A1* | 6/2011 | Leone | F01N 5/02 123/3 |
| 2011/0137537 A1* | 6/2011 | Leone | F02D 41/0027 701/102 |
| 2011/0144881 A1* | 6/2011 | Glugla | F02P 15/08 701/102 |

* cited by examiner

Primary Examiner — John Kwon
Assistant Examiner — Johnny H Hoang (57) ABSTRACT

An internal combustion engine is configured to operate in a homogeneous-charge compression-ignition combustion mode. A method for operating the internal combustion engine includes determining a desired effective charge dilution for a cylinder charge for a cylinder firing event. A desired air/fuel ratio, a desired intake air mass and a desired intake oxygen are determined to achieve the desired effective charge dilution for a combustion event. The desired air/fuel ratio is adjusted based upon a difference between the desired intake oxygen and the actual intake oxygen, and engine operation is controlled to achieve the adjusted desired air/fuel ratio.

14 Claims, 4 Drawing Sheets

METHOD AND APPARATUS FOR CONTROLLING OPERATION OF AN INTERNAL COMBUSTION ENGINE OPERATING IN HCCI COMBUSTION MODE

TECHNICAL FIELD

This disclosure relates to an internal combustion engine configured to operate in a homogeneous-charge compression-ignition (HCCI) combustion mode.

BACKGROUND

The statements in this section merely provide background information related to the present disclosure and may not constitute prior art.

Known spark-ignition (SI) engines introduce an air/fuel mixture into each cylinder that is compressed in a compression stroke and ignited by a spark plug. Known compression-ignition (CI) engines inject pressurized fuel into a combustion cylinder near top dead center (TDC) of the compression stroke that ignites upon injection. Combustion for both SI engines and CI engines involves premixed or diffusion flames controlled by fluid mechanics.

SI engines may operate in different combustion modes, including a homogeneous SI combustion mode and a stratified-charge SI combustion mode. SI engines may be configured to operate in a homogeneous-charge compression-ignition (HCCI) combustion mode, also referred to as controlled auto-ignition combustion, under predetermined speed/load operating conditions. HCCI combustion is a distributed, flameless, kinetically-controlled auto-ignition combustion process with the engine operating at a dilute air/fuel mixture, i.e., lean of a stoichiometric air/fuel point, with relatively low peak combustion temperatures, resulting in low NOx emissions. An engine operating in the HCCI combustion mode forms a cylinder charge that is preferably homogeneous in composition, temperature, and residual exhaust gases at intake valve closing time. The homogeneous air/fuel mixture minimizes occurrences of rich in-cylinder combustion zones that form smoke and particulate emissions.

Engine airflow may be controlled by selectively adjusting position of the throttle valve and adjusting opening and closing of intake valves and exhaust valves. On engine systems so equipped, opening and closing of the intake valves and exhaust valves may be adjusted using a variable valve actuation system that includes variable cam phasing and a selectable multi-step valve lift, e.g., multiple-step cam lobes that provide two or more valve lift positions. In contrast to the throttle position change, the change in valve position of the multi-step valve lift mechanism is a discrete step change.

When an engine operates in a HCCI combustion mode, the engine operates at a lean or stoichiometric air/fuel ratio operation with the throttle wide open to minimize engine pumping losses. When the engine operates in the SI combustion mode, the engine operates at or near stoichiometric air/fuel ratio, with the throttle valve controlled over a range of positions from 0% to 100% of the wide-open position to control intake airflow to achieve the stoichiometric air/fuel ratio. An engine operating in the HCCI combustion mode has improved fuel efficiency when compared to operation in the SI combustion mode due to operating at a lean air/fuel ratio with high EGR dilution in an un-throttled state resulting in relatively low combustion temperatures. The improved fuel efficiency is due to a thermodynamically more efficient operating cycle, lower pumping losses, and reduced cycle heat loss.

Combustion during engine operation in the HCCI combustion mode is affected by cylinder charge gas temperature before and during compression prior to ignition and by mixture composition of a cylinder charge. Known engines operating in HCCI combustion modes account for variations in ambient and engine operating conditions using calibration tables as part of an overall engine control scheme. Known HCCI engine control routines include calibrations for controlling engine parameters using input parameters including, e.g., engine load, engine speed and engine coolant temperature. Cylinder charge gas temperatures may be affected by controlling hot gas residuals via engine valve overlap and controlling cold gas residuals via exhaust gas recirculation. Cylinder charge gas temperatures, pressure, composition may be influenced by engine environment factors including, e.g., air temperature, humidity and altitude, and fuel parameters including, e.g., RVP, energy content and quality.

Combustion during engine operation in the HCCI combustion mode may be characterized in terms of combustion heat release, which may include combustion timing relative to piston position. Combustion timing may be described in terms of a mass-burn-fraction, which indicates a piston position at which a portion of the mass fraction of a cylinder charge is burned. A mass-burn-fraction of interest includes a CA50 point (in crank angle relative to TDC) at which an accumulated heat release reaches 50% of a total heat release of a cylinder charge. Known control systems control combustion timing using feedback control algorithms to compensate for a plurality of effects of environmental and ambient parameters on combustion timing and air/fuel ratio. Alternatively, complex multidimensional calibration tables may be used to account for all the engine environment factors.

SUMMARY

An internal combustion engine is configured to operate in a homogeneous-charge compression-ignition combustion mode. A method for operating the internal combustion engine includes determining a desired effective charge dilution for a cylinder charge for a cylinder firing event. A desired air/fuel ratio, a desired intake air mass and a desired intake oxygen are determined to achieve the desired effective charge dilution for a combustion event. The desired air/fuel ratio is adjusted based upon a difference between the desired intake oxygen and the actual intake oxygen, and engine operation is controlled to achieve the adjusted desired air/fuel ratio.

BRIEF DESCRIPTION OF THE DRAWINGS

One or more embodiments will now be described, by way of example, with reference to the accompanying drawings, in which.

DETAILED DESCRIPTION

Figure 1:
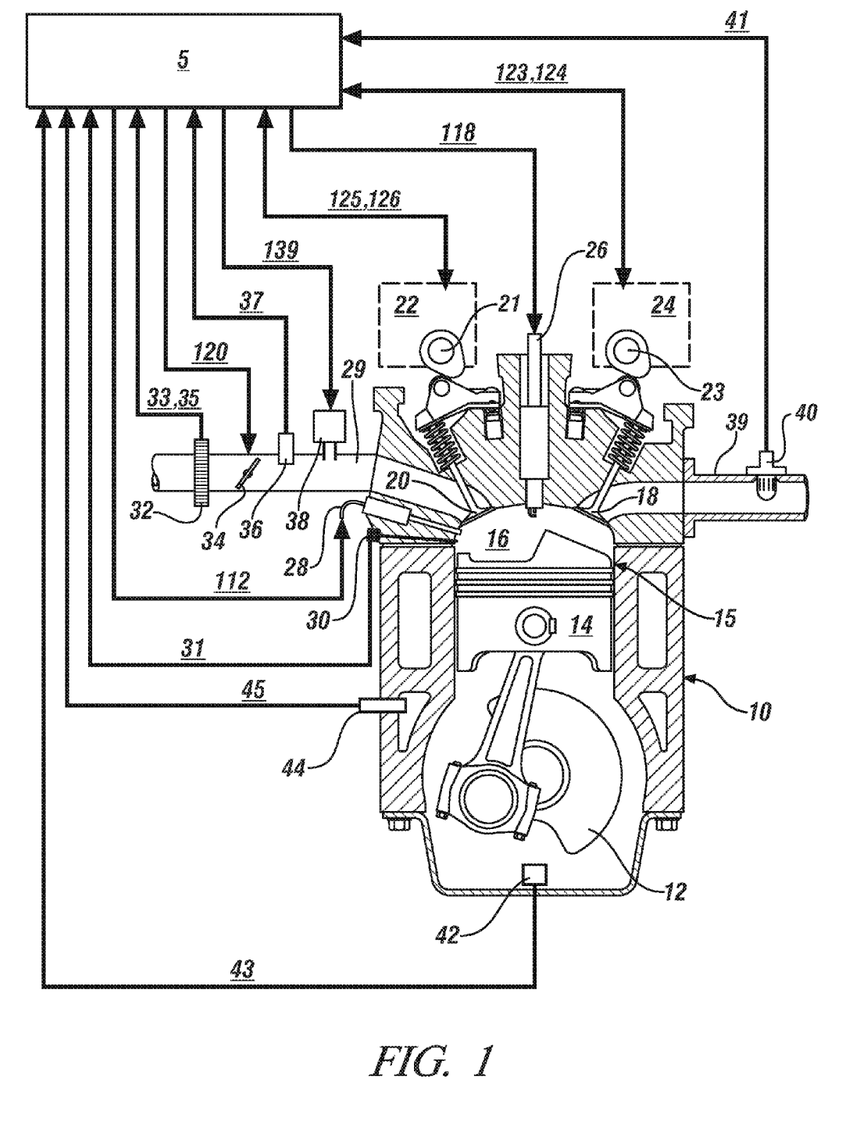
FIG. 1 is illustrates a spark-ignition internal combustion engine configured to operate in a homogeneous-charge compression-ignition (HCCI) combustion mode and an accompanying control module, in accordance with the present disclosure.

Referring now to the drawings, wherein the depictions are for the purpose of illustrating certain exemplary embodiments only and not for the purpose of limiting the same, FIG. 1 is a schematic drawing of an internal combustion engine 10 with an accompanying control module 5 that have been constructed in accordance with an embodiment of this disclosure. The engine 10 is configured to operate in one of a plurality of selectable combustion modes, including a homogeneous-charge compression-ignition (HCCI) combustion mode and a spark-ignition (SI) combustion mode. The engine 10 is configured to operate at a stoichiometric air/fuel ratio and at an air/fuel ratio that is primarily lean of stoichiometry. The disclosure may be applied to various internal combustion engine systems and combustion cycles.

The exemplary engine 10 includes a multi-cylinder direct-injection four-stroke internal combustion engine having reciprocating pistons 14 slidably movable in cylinders 15 that define variable volume combustion chambers 16. Each piston 14 is connected to a rotating crankshaft 12 by which linear reciprocating motion is translated to rotational motion. An air intake system provides intake air to an intake manifold 29 which directs and distributes air into intake runners of the combustion chambers 16. The air intake system has airflow ductwork and devices for monitoring and controlling the air flow. The air intake devices preferably include a mass airflow sensor 32 for monitoring mass airflow (MAF) 33 and intake air temperature (IAT) 35. A throttle valve 34 preferably includes an electronically controlled device that is used to control airflow to the engine 10 in response to a control signal (ETC) 120 from the control module 5. A pressure sensor 36 in the intake manifold 29 is configured to monitor manifold absolute pressure (MAP) 37 and barometric pressure. An external flow passage recirculates exhaust gases from engine exhaust to the intake manifold 29, having a flow control valve referred to as an exhaust gas recirculation (EGR) valve 38. The control module 5 controls mass flow of exhaust gas to the intake manifold 29 by controlling opening of the EGR valve 38 via EGR command 139.

Airflow from the intake manifold 29 into the combustion chamber 16 is controlled by one or more intake valve(s) 20. Exhaust flow out of the combustion chamber 16 is controlled by one or more exhaust valve(s) 18 to an exhaust manifold 39. The engine 10 is equipped with systems to control and adjust openings and closings of the intake and exhaust valves 20 and 18. In one embodiment, the openings and closings of the intake and exhaust valves 20 and 18 may be controlled and adjusted by controlling intake and exhaust variable cam phasing/variable lift control (VCP/VLC) devices 22 and 24 respectively. The intake and exhaust VCP/VLC devices 22 and 24 are configured to control and operate an intake camshaft 21 and an exhaust camshaft 23, respectively. The rotations of the intake and exhaust camshafts 21 and 23 are linked to and indexed to rotation of the crankshaft 12, thus linking openings and closings of the intake and exhaust valves 20 and 18 to positions of the crankshaft 12 and the pistons 14.

The intake VCP/VLC device 22 preferably includes a mechanism operative to switch and control valve lift of the intake valve(s) 20 in response to a control signal (iVLC) 125 and variably adjust and control phasing of the intake camshaft 21 for each cylinder 15 in response to a control signal (iVCP) 126. The exhaust VCP/VLC device 24 preferably includes a controllable mechanism operative to variably switch and control valve lift of the exhaust valve(s) 18 in response to a control signal (eVLC) 123 and variably adjust and control phasing of the exhaust camshaft 23 for each cylinder 15 in response to a control signal (eVCP) 124.

The intake and exhaust VCP/VLC devices 22 and 24 each preferably includes a controllable two-step VLC mechanism operative to control magnitude of valve lift, or opening, of the intake and exhaust valve(s) 20 and 18, respectively, to one of two discrete steps. The two discrete steps preferably include a low-lift valve open position (about 4-6 mm in one embodiment) preferably for low speed, low load operation, and a high-lift valve open position (about 8-13 mm in one embodiment) preferably for high speed and high load operation. The intake and exhaust VCP/VLC devices 22 and 24 each preferably includes a variable cam phasing mechanism to control and adjust phasing (i.e., relative timing) of opening and closing of the intake valve(s) 20 and the exhaust valve(s) 18 respectively. Adjusting phasing refers to shifting opening times of the intake and exhaust valve(s) 20 and 18 relative to positions of the crankshaft 12 and the piston 14 in the respective cylinder 15. The VCP mechanisms of the intake and exhaust VCP/VLC devices 22 and 24 each preferably has a range of phasing authority of about 60°-90° of crank rotation, thus permitting the control module 5 to advance or retard opening and closing of one of intake and exhaust valve(s) 20 and 18 relative to position of the piston 14 for each cylinder 15. The range of phasing authority is defined and limited by the intake and exhaust VCP/VLC devices 22 and 24. The intake and exhaust VCP/VLC devices 22 and 24 include camshaft position sensors to determine rotational positions of the intake and the exhaust camshafts 21 and 23. The VCP/VLC devices 22 and 24 are actuated using one of electro-hydraulic, hydraulic, and electric control force, in response to the respective control signals eVLC 123, eVCP 124, iVLC 125, and iVCP 126. In one embodiment the engine 10 is equipped with only intake and exhaust variable cam phasing devices.

The engine 10 employs a direct-injection fuel injection system including a plurality of high-pressure fuel injectors 28 that are configured to directly inject a mass of fuel into the combustion chambers 16 in response to an injector pulse-width command (INJ_PW) 112 from the control module 5. The fuel injectors 28 are supplied pressurized fuel from a fuel distribution system. The engine 10 employs a spark-ignition system by which spark energy may be provided to a spark plug 26 for igniting or assisting in igniting cylinder charges in each of the combustion chambers 16 in response to a spark command (IGN) 118 from the control module 5.

The engine 10 is equipped with various sensing devices for monitoring engine operation, including a crank sensor 42 having an output indicative of crankshaft rotational position, i.e., crank angle and speed (RPM) 43. A temperature sensor 44 is configured to monitor coolant temperature 45. An in-cylinder combustion sensor 30 is configured to monitor combustion, and is a cylinder pressure sensor operative to monitor in-cylinder combustion pressure 31 in one embodiment. An exhaust gas sensor 40 is configured to monitor an exhaust gas parameter 41, e.g., actual air/fuel ratio (AFR). The combustion pressure 31 and the RPM 43 are monitored by the control module 5 to determine combustion timing, i.e., timing of combustion pressure relative to the crank angle of the crankshaft 12 for each cylinder 15 for each combustion cycle. It is appreciated that combustion timing may be determined by other methods. The combustion pressure 31 may be monitored by the control module 5 to determine an indicated mean effective pressure (IMEP) for each cylinder 15 for each combustion cycle. Preferably, the engine 10 and control module 5 are configured to monitor and determine states of IMEP for each of the engine cylinders 15 during each cylinder firing event. Alternatively, other sensing systems may be used to monitor states of other combustion parameters within the scope of the disclosure, e.g., ion-sense ignition systems, EGR fractions, and non-intrusive cylinder pressure sensors.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Control routines are executed, such as by a central processing unit, and are operable to monitor inputs from sensing devices and other networked control modules, and execute control and diagnostic routines to control operation of actuators. Routines may be executed at regular intervals, for example each 100 microseconds, 3.125, 6.25, 12.5, 25 and 100 milliseconds during ongoing engine and vehicle operation. Alternatively, routines may be executed in response to occurrence of an event.

The control module 5 monitors inputs from the aforementioned sensors to determine states of engine parameters. The control module 5 receives operator commands, e.g., via an accelerator pedal and a brake pedal to determine an operator torque request, from which engine control parameters and an engine torque command are derived. The control module 5 executes control routines stored therein to determine states for the engine control parameters to control the aforementioned actuators to form a cylinder charge, including controlling throttle position, turbocharger boost, spark-ignition timing, fuel injection pulsewidth affecting injected fuel mass and timing, EGR valve position to control flow of recirculated exhaust gases, and intake and/or exhaust valve timing and phasing. Valve timing and phasing may include negative valve overlap (NVO) and lift of exhaust valve reopening (in an exhaust re-breathing strategy), and positive valve overlap (PVO). Engine parameters associated with a cylinder charge that are affected by individual engine control parameters include as follows: engine mass airflow (MAF) and actual air/fuel ratio, which are controlled by the fuel injection pulsewidth and affects amount of fuel injected for a cylinder event; MAF, which is controlled by controlling NVO/PVO and affects magnitude of residuals in a cylinder; intake oxygen, which is controlled by the EGR valve and affects magnitude of external EGR for a cylinder event; MAP, which is controlled by the ETC and turbocharger (when employed) and affects magnitude of trapped air mass in the cylinder; and mass-burn-fraction (CA50), which is controlled by spark timing and/or timing of pilot fuel injection and affects combustion phasing when operating in the HCCI combustion mode.

The engine parameters of MAF, actual air/fuel ratio, intake oxygen, MAP and CA50 can be directly measured using sensors, inferred from other sensed parameters, estimated, derived from algorithmic models or otherwise determined The actuators controlling the fuel injection pulsewidth, valve timing and phasing (NVO/PVO) and CA50 are considered fast actuators because they can implement actuator commands and achieve a preferred operating state to effect a change in engine operation within a single engine cycle. The EGR valve, ETC and turbocharger are considered slow actuators because, although they may implement actuator commands within a single engine cycle, they are unable to achieve a preferred operating state and/or fully effect a change in engine operation until the execution of multiple engine cycles. The effect of a slow actuator upon engine operation is delayed due to transport lags, manifold fill times and other factors.

An engine operating in the HCCI combustion mode experiences audible combustion ringing caused by short burn durations and high heat release rates. Ringing may be mitigated by increasing cylinder charge dilution through a leaner air/fuel ratio, added excess air, and/or added external EGR. Added excess air and added external EGR increase cylinder charge mass and reduce average cylinder charge temperatures, thus slowing overall heat release rates. Thus, increased EGR rates are used to temper the peak heat release rates and limit combustion ringing as engine load increases.

Figure 2:
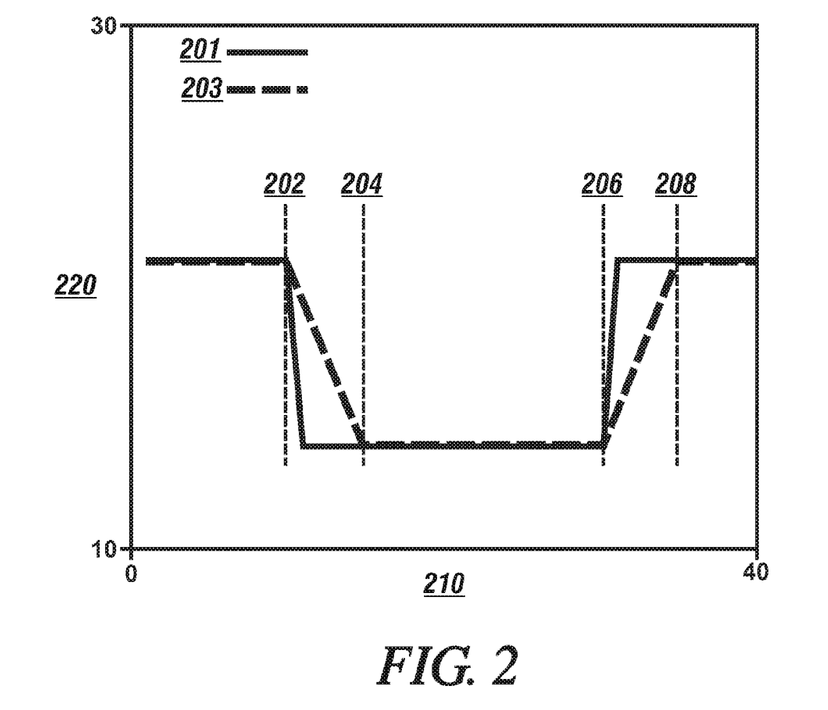
FIG. 2 illustrates effects of EGR transport lag on intake oxygen in a cylinder charge during transients including an engine load increase tip-in event and an engine load decrease tip-out event, in accordance with the disclosure.

FIG. 2 graphically depicts effects of EGR transport lag on intake oxygen in a cylinder charge during transients including an engine load increase (accelerator pedal tip-in (tip-in)) and an engine load decrease (accelerator pedal tip-out or (tip-out)). Known internal combustion engines configured to operate in HCCI combustion modes are challenged to maintain a preferred cylinder charge dilution during transients due to response times associated with EGR transport lag. EGR transport lag is due to flow of recirculated exhaust gas through a relatively long external EGR flow passage at a low pressure differential. An internal combustion engine operating without external EGR has an intake charge including ambient level of oxygen, which is near 21% for an engine operating at sea level. An EGR fraction serves to displace oxygen in an intake charge, with an oxygen charge decreasing from 21% with increasing EGR fraction.

The intake oxygen (%) 220 is shown on the vertical axis in relation to time (sec) 210 on the horizontal axis, including desired intake oxygen 201 and actual intake oxygen 203 in a cylinder charge during transient operations including a tip-in event that initiates at time 202 and a tip-out event that initiates at time 206. A tip-in event is associated with an operator-initiated command for increased engine load, which has a corresponding decrease in magnitude of the desired intake oxygen 201 in the cylinder charge. EGR transport lag causes the actual intake oxygen 203 to lag in achieving the desired intake oxygen 201, with a delay in reaching the desired intake oxygen 201 in the cylinder charge until time 204. During the period between times 202 and 204, each cylinder firing event includes a cylinder charge having a lower EGR fraction, i.e., lower EGR dilution than expected, resulting in burst ringing due to increased heat release rates and increased cylinder pressure rise rates. A tip-out event is associated with an operator-initiated command for decreased engine load, which has a corresponding increase in magnitude of the desired intake oxygen 201. Presence of existing EGR in the system and EGR transport lag causes the actual intake oxygen 203 in a cylinder charge to lead in achieving the desired intake oxygen 201, with a delay in reaching the desired intake oxygen 201 in the cylinder charge until time 208. During the period between times 206 and 208, each cylinder firing event includes a cylinder charge having a greater EGR fraction, i.e., greater EGR dilution than expected, resulting in partial burns and cylinder misfire due to decreased heat release rates and decreased cylinder pressure rise rates. Occurrences of burst ringing, partial burns and cylinder misfire are undesirable and preferably avoided during engine operation.

Cylinder charge dilution is quantified with an effective charge dilution (ED) term, which is defined in accordance with the following relationship:

$$ED = \alpha \frac{\text{Ambient Intake } O_2(\%) - \text{Intake } O_2(\%)}{\text{Ambient Intake } O_2(\%)} + \beta \frac{AFR - \text{Stoichiometric } AFR}{\text{Stoichiometric } AFR} \quad [1]$$

wherein Ambient Intake $O_2$ is an amount (in %) of oxygen in ambient air,

Intake $O_2$ is an actual amount (in %) of oxygen in engine intake air,

AFR is the actual air/fuel ratio,

Stoichiometric AFR is the stoichiometric air/fuel ratio for the fuel, and $\alpha$ and $\beta$ are positive, calibratable/tunable parameters.

The relationship of EQ. 1 can be simplified for systems operating at or near sea level as the following relationship.

$$ED = \alpha \frac{21\% - \text{Intake } O_2(\%)}{21\%} + \beta \frac{AFR - 14.6}{14.6} \quad [2]$$

The intake air and the external EGR may be treated as two separate, additive, controllable sources of charge dilution, with the constants acting as weighting factors for each of the two sources. Thus, every engine speed/load operating point has an associated ED term that is determined in relation to a desired air/fuel ratio and a desired EGR fraction associated with that engine operating point.

Figure 3:
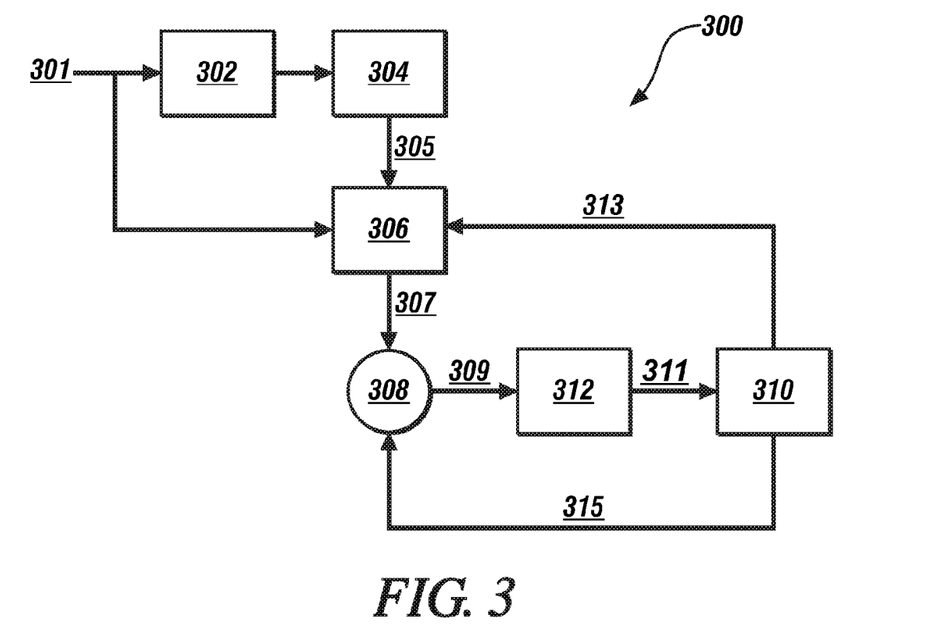
FIG. 3 illustrates an effective charge dilution (ED) engine control routine for controlling engine operation in the HCCI combustion mode to maintain overall effective charge dilution in a cylinder charge, in accordance with the disclosure.

FIG. 3 schematically shows an effective charge dilution (ED) engine control routine 300 for controlling engine operation in the HCCI combustion mode to maintain the overall effective charge dilution in a cylinder charge by controlling intake mass airflow and the air/fuel ratio responsive to transient delays in the EGR fraction and changes in intake airflow during transient engine operation, including tip-in events and tip-out events. When the EGR fraction has not achieved its desired value as determined through monitoring intake airflow and intake oxygen, additional excess air can be used as a substitute until the desired EGR fraction has been achieved. The benefit of using air in place of deficient EGR is that trapped air can be controlled on a cycle-to-cycle basis through variable cam phasing. In effect, if there is a lag in achieving the desired in-cylinder EGR fraction, additional excess air can be used as a substitute in the commanded ED for the engine operating point. Conversely, when there is excess EGR fraction in a cylinder charge, as may occur in a tip-out event, the commanded ED can be achieved by decreasing the amount of excess air trapped in the cylinder.

The ED relationship defined in EQS. 1 and 2 can be rewritten as the following relationship:

$$A/F_{bias} = C_1 \frac{\alpha}{\beta}(\text{Actual Intake } O_2 - \text{Desired Intake } O_2) \quad [3]$$

wherein $C_1$, $\alpha$, and $\beta$ are constants.

The relationship shown in EQ. 3 can be employed to determine an air/fuel ratio bias term $A/F_{bias}$ based upon a difference between desired intake oxygen and actual intake oxygen, with the $A/F_{bias}$ employed to adjust the desired air/fuel ratio. Thus, the engine controller can control engine operation responsive to an air/fuel ratio setpoint that is leaner than the desired air/fuel ratio in response to a tip-in event, and control engine operation responsive to an air/fuel ratio setpoint that is richer than the desired air/fuel ratio in response to a tip-out event to offset the transport lag in the EGR fraction.

The ED engine control routine 300 monitors a desired engine operating point 301, preferably including engine speed and a desired engine fueling rate, which are input to a calibration 302 to determine an effective charge dilution (ED) setpoint that is subjected to a low-pass filter 304 to determine a desired ED setpoint 305. The desired ED setpoint 305, the desired engine operating point 301, and an actual intake oxygen to the engine are employed by control routine 306 to determine desired engine operating points 307. The desired engine operating points 307 preferably include the desired air/fuel ratio, desired intake oxygen, and a desired mass airflow rate to achieve the desired ED setpoint 305.

The desired mass airflow rate is determined by multiplying the desired engine fueling rate and the desired air/fuel ratio. The desired intake oxygen is determined as a function of the desired engine fueling rate and the engine speed. The desired air/fuel ratio is determined based upon the desired ED setpoint 305 in accordance with the following relationship:

$$ED = \frac{21(\%) - \text{Intake } O_2(\%)}{21(\%)} + \frac{\text{Desired } AFR - 14.6}{14.6} \quad [4]$$

wherein Intake $O_2$ is an actual amount (in %) of oxygen in intake air, and

Desired AFR is the desired air/fuel ratio.

The desired air/fuel ratio, desired intake oxygen, and desired mass airflow rate are employed to control actuators on an internal combustion engine 310 of FIG. 1. The engine parameters for the engine 315 including actual air/fuel ratio, actual intake oxygen, and actual mass airflow rate (MAF) are preferably directly monitored or otherwise determined and provided as feedback to a difference operator 308, which determines arithmetic differences 309 between the desired air/fuel ratio, desired intake oxygen, and desired mass airflow rate and the respective actual air/fuel ratio, actual intake oxygen, and actual mass airflow rate. The arithmetic differences 309 are provided as inputs to a multiple input-multiple output (MIMO) controller 312, which determines states for engine control parameters 311 including fuel injector pulsewidth, EGR valve pulsewidth or position, and VCP cam phasing for controlling operation of the engine 310 in response. MIMO controllers for controlling engine operation are known and not described herein.

A second feedback loop 313 communicates the actual intake oxygen to the engine to the control routine 306 to determine the desired engine operating point 307. Thus, the fuel injector, EGR valve, and VCP device can be controlled responsive to the desired ED setpoint 305. More specifically, a difference between the desired intake oxygen and the actual intake oxygen can be employed to determine the air/fuel ratio bias term (A/F$_{bias}$) as described with reference to EQ. 3. One or multiple fast engine actuators are employed to control engine operation to an air/fuel ratio setpoint that incorporates the air/fuel ratio bias term. The air/fuel ratio bias term may be added to or subtracted from the desired air/fuel ratio to determine the air/fuel ratio setpoint in one embodiment. In one embodiment, the fast engine actuator is an intake VCP device that is adjusted in response the air/fuel ratio setpoint.

Figure 4:
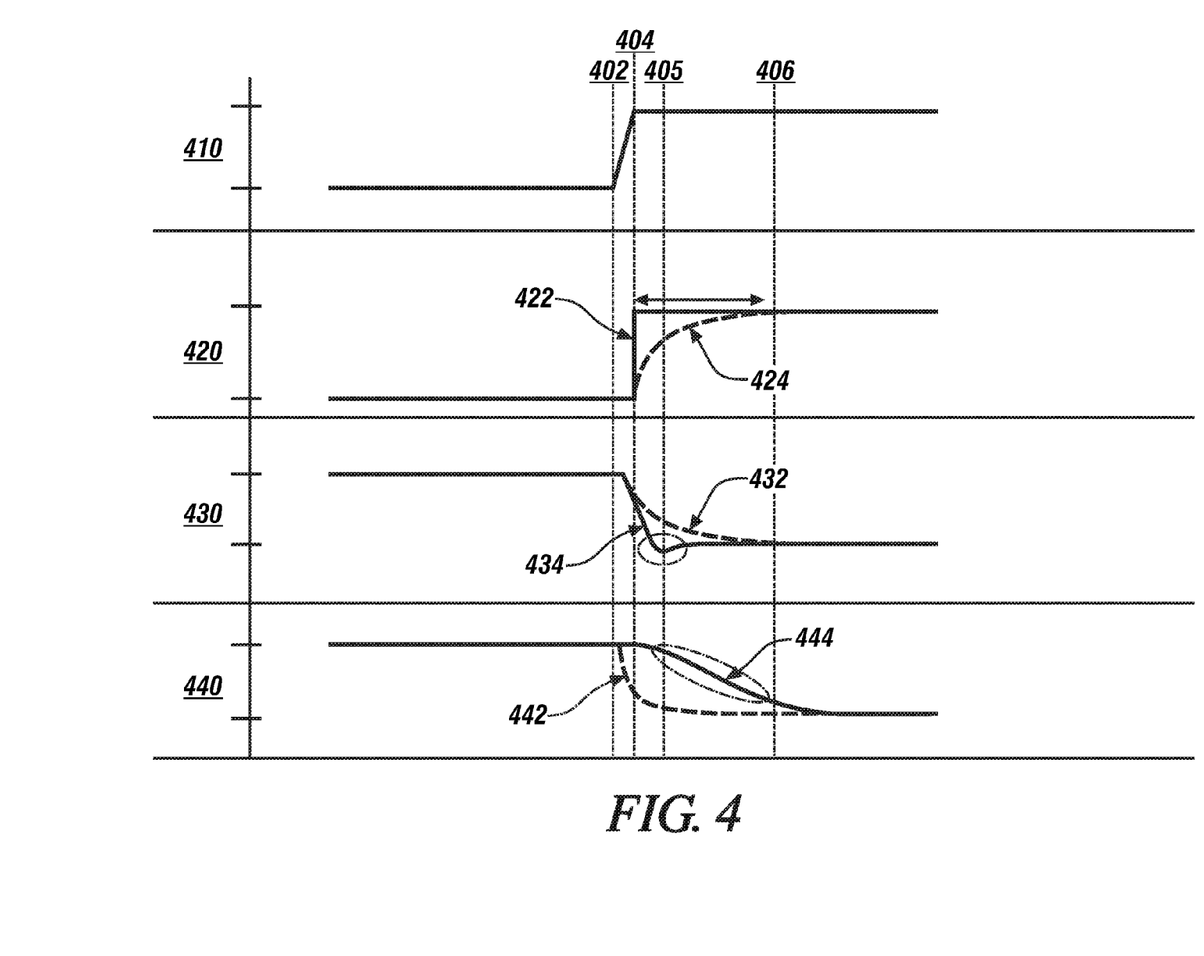
FIG. 4 illustrates engine operation responsive to a tip-in event for a baseline control system and an embodiment of the ED engine control routine of FIG. 3, in accordance with the disclosure.

FIG. 4 graphically shows engine operation responsive to a tip-in event, including engine load 410, EGR (%) 420, cam phasing (NVO-degrees) 430 and air/fuel ratio 440 for a baseline control system and an embodiment of the ED engine control routine 300 of FIG. 3, plotted in relation to time on the horizontal axis. Initially, the engine is operating at a low load (e.g., 10 mg/cycle) with EGR at 5% and the cam phasing at a magnitude of negative valve overlap associated with low load operation, which is 150° as shown. At time 402, a tip-in event increases engine load (e.g., increases to 18 mg/cycle) resulting in a commanded change in a desired EGR (%) 422, which occurs at time 404. The cylinder charge increases to 15% to maintain ED at a desired ED magnitude with a corresponding reduction in the desired air/fuel ratio, which is shown as a baseline air/fuel ratio 442 that decreases in response to the change in load. Actual EGR (%) 424 responds slowly, not achieving the magnitude of desired EGR 422 until time 406 due to transport lag. Cam phasing baseline control 432 is shown, and includes a slow transition to a magnitude of negative valve overlap that is associated with the increased engine load, which is 120° as shown.

When the ED engine control routine 300 is employed, the desired air/fuel ratio is adjusted as shown at line 444, providing extra air dilution for each cylinder charge during the transition in response to a tip-in event to compensate for the relatively slow change in the actual EGR 424. The adjusted cam phasing control 434 is controlled to compensate for the transport lag-related delay in achieving the desired EGR and includes a rapid transition to achieve the negative valve overlap of 120°, including some degree of overshoot at time 405 to compensate for deficient amount of EGR, thus providing extra air into the intake charge to maintain the desired ED magnitude during the period until the actual EGR 424 achieves the magnitude of desired EGR 422. In this manner, the ED engine control routine 300 increases an amount of air to each cylinder charge to compensate for the transport lag-related delay in achieving the desired EGR to increase dilution and thus reduces or eliminates occurrence of combustion ringing during a tip-in event. The ED engine control routine 300 operates in an analogous manner in response to a tip-out event, including reducing an amount of air to each cylinder charge to compensate for the transport lag-related delay in achieving the desired EGR to decrease dilution and thus reduce or eliminate occurrence of combustion misfires during a tip-out event.

Figure 5:
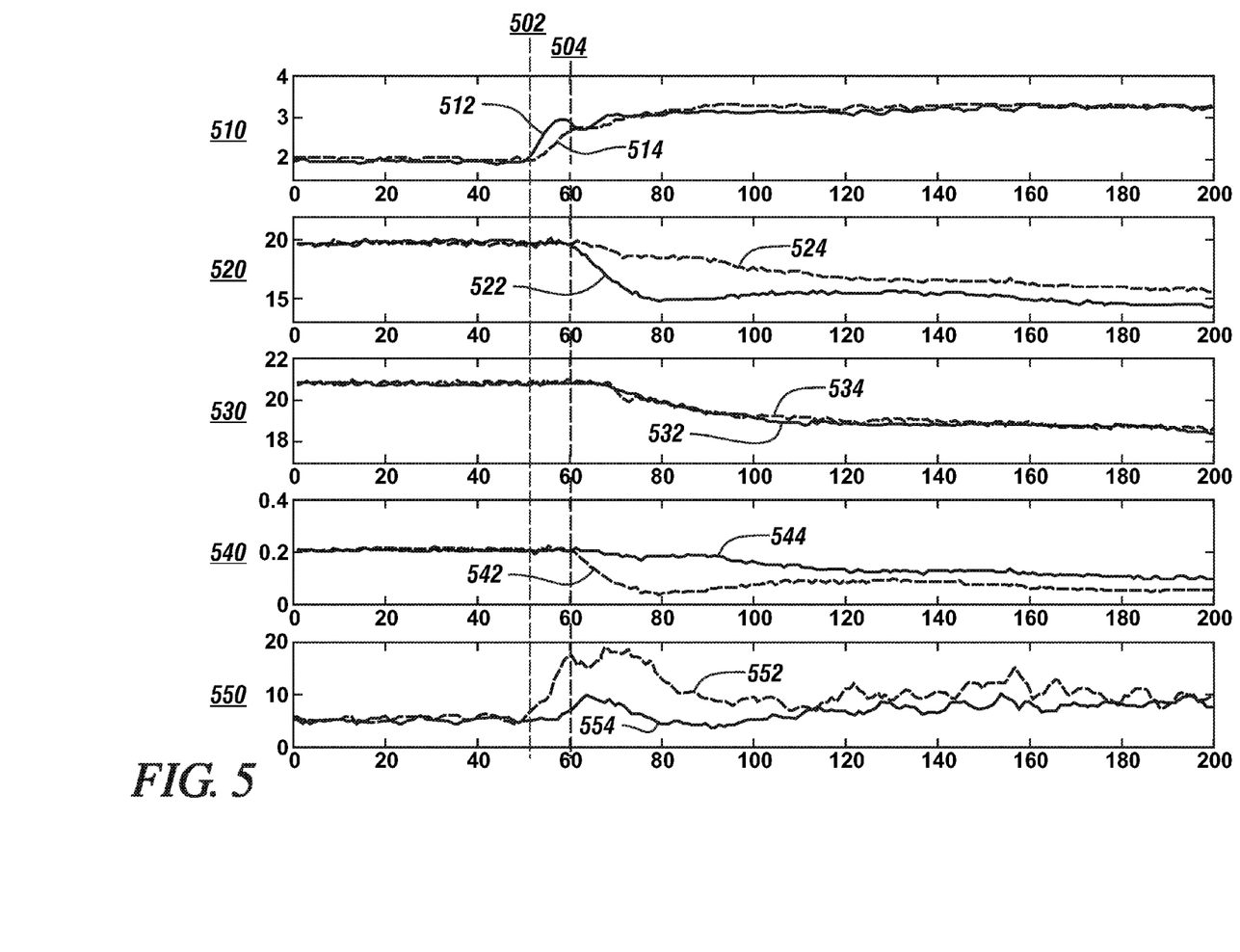
FIG. 5 illustrates results associated with engine operation responsive to a tip-in event for a baseline control system and for an embodiment of the ED engine control routine of FIG. 3, in accordance with the disclosure.

FIG. 5 graphically shows results associated with engine operation responsive to a tip-in event for a baseline control system and for an embodiment of the ED engine control routine 300 (ED-adjusted) of FIG. 3, plotted in relation to engine cycles on the horizontal axis. Graphed parameters include engine load (NMEP, bar) 510, actual air/fuel ratio 520, intake oxygen (%) 530, effective dilution 540 and Ringing Index (MW/mm$^2$) 550. At time 502, a tip-in event causes a change in the engine load, with an immediate divergence in the engine load between baseline load 512 and ED-adjusted load 514 and a corresponding immediate divergence between a baseline Ringing Index 552 and an ED-adjusted Ringing Index 554. There is no divergence between a baseline air/fuel ratio 522 and an ED-adjusted air/fuel ratio 524, or between a baseline intake oxygen 532 and an ED-adjusted intake oxygen 534. Thus the resultant baseline ED 542 and adjusted ED 544 are unchanged. At time 504, the baseline air/fuel ratio 522 decreases in response to the increased load with no change in other engine air controls, and thus the baseline intake oxygen 532 remains unchanged initially due to lack of change in amount of EGR gas in a cylinder charge. Engine ringing increases as indicated by an increased magnitude in the baseline Ringing Index 552. In contrast, the ED-adjusted air/fuel ratio 524 remains leaner and decreases at a relatively slow rate responsive to the change in engine load, and the ED-adjusted intake oxygen 534 tracks the baseline intake oxygen 532 in response to the analogous ED-adjusted load 514.

The ED-adjusted air/fuel ratio 524 and the ED-adjusted intake oxygen 534 can be achieved by controlling cam phasing, including controlling cam phasing responsive to an air/fuel ratio bias term A/F$_{bias}$ term based upon a difference between desired intake oxygen and actual intake oxygen, with the air/fuel ratio bias term A/F$_{bias}$ added to a desired air/fuel ratio. At this point, the adjusted ED 544 correspondingly decreases at a relatively slow rate responsive to the load, resulting in the ED-adjusted Ringing Index 554 remaining at a low magnitude substantially less than the baseline Ringing Index 552.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for operating an internal combustion engine configured to operate in a homogeneous-charge compression-ignition (HCCI) combustion mode, comprising:
    determining a desired effective charge dilution for a cylinder firing event in accordance with the following relationship:

$$ED = \alpha \frac{\text{Ambient Intake } O_2 \ (\%) - \text{Intake } O_2 \ (\%)}{\text{Ambient Intake } O_2 \ (\%)} + \beta \frac{AFR - \text{Stoichiometric } AFR}{\text{Stoichiometric } AFR}$$

wherein Ambient Intake $O_2$ is an amount (in %) of oxygen in ambient air,
    Intake $O_2$ is an actual amount (in %) of oxygen in engine intake air,
    AFR is an actual air/fuel ratio,
    Stoichiometric AFR is the stoichiometric air/fuel ratio for the fuel, and
    α and β are positive, calibratable/tunable parameters;
    determining a desired air/fuel ratio, a desired intake air mass, and a desired intake oxygen to achieve the desired effective charge dilution;
    adjusting the desired air/fuel ratio based upon a difference between the desired intake oxygen and an actual intake oxygen; and
    controlling engine operation to achieve the adjusted desired air/fuel ratio.

2. The method of claim 1, wherein controlling engine operation to achieve the adjusted desired air/fuel ratio comprises controlling a fast engine actuator to achieve the adjusted desired air/fuel ratio.

3. The method of claim 2, wherein controlling the fast engine actuator to achieve the adjusted desired air/fuel ratio comprises controlling a setpoint for a variable cam phaser to achieve the adjusted desired air/fuel ratio.

4. The method of claim 1, wherein adjusting the desired air/fuel ratio based upon the difference between the desired intake oxygen and the actual intake oxygen comprises adjusting the desired air/fuel ratio to an air/fuel ratio setpoint that is leaner than the desired air/fuel ratio in response to a change in an operator torque request comprising an accelerator pedal tip-in event.

5. The method of claim 1, wherein adjusting the desired air/fuel ratio based upon the difference between the desired intake oxygen and the actual intake oxygen comprises adjusting the desired air/fuel ratio to an air/fuel ratio setpoint that is richer than the desired air/fuel ratio in response to a change in an operator torque request comprising an accelerator pedal tip-out event.

6. The method of claim 1, wherein adjusting the desired air/fuel ratio based upon the difference between the desired intake oxygen and the actual intake oxygen comprises adjusting the desired air/fuel ratio in response to a change in engine load.

7. Method for operating an internal combustion engine configured to operate in a homogeneous-charge compression-ignition (HCCI) combustion mode, comprising:
 determining a desired effective charge dilution for a cylinder firing event in response to a change in an operator torque request during operation in the HCCI combustion mode in accordance with the following relationship:

$$ED = \alpha \frac{\text{Ambient Intake } O_2 \ (\%) - \text{Intake } O_2 \ (\%)}{\text{Ambient Intake } O_2 \ (\%)} + \beta \frac{AFR - \text{Stoichiometric } AFR}{\text{Stoichiometric } AFR}$$

wherein Ambient Intake $O_2$ is an amount (in %) of oxygen in ambient air,
 Intake $O_2$ is an actual amount (in %) of oxygen in engine intake air,
 AFR is an actual air/fuel ratio,
 Stoichiometric AFR is the stoichiometric air/fuel ratio for the fuel, and
 $\alpha$ and $\beta$ are positive, calibratable/tunable parameters;
 determining a desired air/fuel ratio, a desired intake air mass, and a desired intake oxygen to achieve the desired effective charge dilution;
 monitoring actual intake oxygen;
 adjusting the desired air/fuel ratio based upon a difference between the actual intake oxygen and the desired intake oxygen; and
 controlling engine operation to achieve the adjusted desired air/fuel ratio for subsequent firing events.

8. The method of claim 7, wherein controlling engine operation to achieve the adjusted desired air/fuel ratio comprises controlling a fast engine actuator to achieve the adjusted desired air/fuel ratio.

9. The method of claim 8, wherein controlling the fast engine actuator to achieve the adjusted desired air/fuel ratio comprises controlling a setpoint for a variable cam phaser to achieve the adjusted desired air/fuel ratio.

10. The method of claim 7, wherein adjusting the desired air/fuel ratio based upon the difference between the actual intake oxygen and the desired intake oxygen comprises adjusting the desired air/fuel ratio to an air/fuel ratio setpoint that is leaner than the desired air/fuel ratio in response to a change in the operator torque request comprising an accelerator pedal tip-in event.

11. The method of claim 7, wherein adjusting the desired air/fuel ratio based upon the difference between the actual intake oxygen and the desired intake oxygen comprises adjusting the desired air/fuel ratio to an air/fuel ratio setpoint that is richer than the desired air/fuel ratio in response to a change in the operator torque request comprising an accelerator pedal tip-out event.

12. The method of claim 7, wherein adjusting the desired air/fuel ratio based upon the difference between the actual intake oxygen and the desired intake oxygen comprises adjusting the desired air/fuel ratio in response to a change in engine load associated with the change in the operator torque request.

13. An internal combustion engine, comprising:
 an intake manifold;
 an exhaust manifold;
 a combustion chamber;
 a phase controllable intake valve for controlling airflow from the intake manifold to the combustion chamber;
 a phase controllable exhaust valve for controlling exhaust flow from the combustion chamber to the exhaust manifold;
 an exhaust gas recirculation system for controlling exhaust flow from the exhaust manifold to the intake manifold; and
 a control system comprising a control module to provide a setpoint for an effective charge dilution comprising a predetermined relationship between an air-fuel ratio and an intake oxygen fraction, determine an air-fuel ratio adjustment based upon the difference between an actual intake oxygen fraction and a desired intake oxygen fraction, and control the intake and exhaust valve phase relationship to effect the air-fuel ratio adjustment by trapped air in order to maintain said setpoint for the effective charge dilution.

14. The internal combustion engine of claim 13, wherein said predetermined relationship between the air-fuel ratio and the intake oxygen fraction comprises the following relationship:

$$ED = \alpha \frac{\text{Ambient Intake } O_2 \ (\%) - \text{Intake } O_2 \ (\%)}{\text{Ambient Intake } O_2 \ (\%)} + \beta \frac{AFR - \text{Stoichiometric } AFR}{\text{Stoichiometric } AFR}$$

wherein Ambient Intake $O_2$ is an amount (in %) of oxygen in ambient air,
 Intake $O_2$ is an actual amount (in %) of oxygen in engine intake air,
 AFR is an actual air/fuel ratio,
 Stoichiometric AFR is the stoichiometric air/fuel ratio for the fuel, and
 $\alpha$ and $\beta$ are positive, calibratable/tunable parameters.

* * * * *